United States Patent
Dubrow et al.

(10) Patent No.: US 11,620,290 B2
(45) Date of Patent: Apr. 4, 2023

(54) METHOD AND SYSTEM FOR PERFORMING DATA CLOUD OPERATIONS

(71) Applicant: Veeva Systems Inc., Pleasanton, CA (US)

(72) Inventors: Adam Dubrow, New York, NY (US); Shahdidul Mihal Ahsan, Jersey City, NJ (US); Asaf Evenhaim, New York, NY (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 17/162,589

(22) Filed: Jan. 29, 2021

(65) Prior Publication Data

US 2022/0245151 A1  Aug. 4, 2022

(51) Int. Cl.
| | |
|---|---|
| *G06F 16/00* | (2019.01) |
| *G06F 16/2453* | (2019.01) |
| *G06F 16/215* | (2019.01) |
| *G06F 16/2455* | (2019.01) |
| *G06F 16/242* | (2019.01) |

(52) U.S. Cl.
CPC ...... *G06F 16/24545* (2019.01); *G06F 16/215* (2019.01); *G06F 16/2425* (2019.01); *G06F 16/2455* (2019.01)

(58) Field of Classification Search
None
See application file for complete search history.

(56) References Cited

FOREIGN PATENT DOCUMENTS

| CN | 109002548 A | * | 12/2018 | ............. G06Q 40/04 |
| CN | 106778794 B | * | 4/2020 | ............... G06K 9/54 |

\* cited by examiner

*Primary Examiner* — Bai D Vu
(74) *Attorney, Agent, or Firm* — Baker & McKenzie

(57) ABSTRACT

Systems and methods are provided for managing and accessing data using one or more data cloud servers. An exemplary method includes: receiving from one or more data sources, a first data set; stratifying the first data set into first samples; receiving from second one or more data sources, a second data set; stratifying the second data set into second samples; computing a projection factor for each of the second samples using the first samples; computing projected samples using the projection factor for each of the second samples; receiving from third one or more data sources, a third data set; computing a parameter using the third data set; selecting one or more of the projected samples to form a fourth data set; and performing a computer operation for estimating the data using the fourth data set and the parameter.

20 Claims, 8 Drawing Sheets

METHOD AND SYSTEM FOR PERFORMING DATA CLOUD OPERATIONS

TECHNICAL FIELD

The present disclosure relates to methods and systems for performing data cloud operations, and in particular a data cloud server utilizing various techniques for improving analysis operations.

BACKGROUND

Researchers, scientists, industry players, academics, government regulators, and other stakeholders are increasingly in need to find new ways to estimate data as accurately as possible given limited underlying data.

SUMMARY

According to one aspect of the subject matter described in this disclosure, a method for performing data cloud operations using one or more data cloud servers is provided. The method includes the following: receiving, using one or more computing device processors, a first request for estimating data; identifying, using the one or more computing device processors, one or more data sources based on the first request to retrieve a first data set for estimating the data; forming, using the one or more computing device processors, first queries to send to the one or more data sources for retrieving the first data set; initiating, using the one or more computing device processors, execution of the first queries at the one or more data sources for retrieving the first data set; receiving, using the one or more computing device processors, from the one or more data sources, the first data set; stratifying, using the one or more computing device processors, the first data set into first samples based on one or more dimensions; identifying, using the one or more computing device processors, second or more data sources for retrieving a second data set associated with the first samples and the one or more dimensions; forming, using the one or more computing device processors, second queries to send to the second one or more data sources for retrieving the second data set; initiating, using the one or more computing device processors, execution of the second queries at the second one or more data sources for retrieving the second data set; receiving, using the one or more computing device processors, from the second one or more data sources, the second data set; stratifying, using the one or more computing device processors, the second data set into second samples based the on one or more dimensions; computing, using the one or more computing device processors, a projection factor for each of the second samples using the first samples; computing, using the one or more computing device processors, projected samples using the projection factor for each of the second samples; identifying, using the one or more computing device processors, third one or more data sources for retrieving a third data set different from the first data set or the second data set; forming, using the one or more computing device processors, third queries to send to the third one or more data sources for retrieving the third data set; initiating, using the one or more computing device processors, execution of the third queries at the third one or more data sources for retrieving the third data set; receiving, using the one or more computing device processors, from the third one or more data sources, the third data set; computing, using the one or more computing device processors, a parameter using the third data set; selecting, using the one or more computing device processors, one or more of the projected samples to form a fourth data set; and performing, using the one or more computing device processors, a computer operation for estimating the data using the fourth data set and the parameter.

According to another aspect of the subject matter described in this disclosure, a system for performing data cloud operations using one or more data cloud servers is provided. The system includes one or more computing device processors. One or more computing device memories are coupled to the one or more computing device processors. The one or more computing device memories store instructions executed by the one or more computing device processors, the instructions are configured to: receive a first request for estimating data; identify one or more data sources based on the first request to retrieve a first data set for estimating the data; form first queries to send to the one or more data sources for retrieving the first data set; initiate execution of the first queries at the one or more data sources for retrieving the first data set; receive from the one or more data sources, the first data set; stratify the first data set into first samples based on one or more dimensions; identify second or more data sources for retrieving a second data set associated with the first samples and the one or more dimensions; form second queries to send to the second one or more data sources for retrieving the second data set; initiate execution of the second queries at the second one or more data sources for retrieving the second data set; receive from the second one or more data sources, the second data set; stratify the second data set into second samples based the on one or more dimensions; compute a projection factor for each of the second samples using the first samples; compute projected samples using the projection factor for each of the second samples; identify third one or more data sources for retrieving a third data set different from the first data set or the second data set; form third queries to send to the third one or more data sources for retrieving the third data set; initiate execution of the third queries at the third one or more data sources for retrieving the third data set; receive from the third one or more data sources, the third data set; compute a parameter using the third data set; select one or more of the projected samples to form a fourth data set; and perform a computer operation for estimating the data using the fourth data set and the parameter.

According to another aspect of the subject matter described in this disclosure, a method for performing data cloud operations using one or more data cloud servers is provided. The method includes the following: receiving, using the one or more computing device processors, from one or more data sources, at least a first data set; stratifying, using the one or more computing device processors, the at least first data set into at least first samples based on one or more dimensions; receiving, using the one or more computing device processors, from second one or more data sources, a second data set; stratifying, using the one or more computing device processors, the second data set into second samples based the on one or more dimensions; computing, using the one or more computing device processors, a projection factor for each of the second samples using the at least first samples; computing, using the one or more computing device processors, projected samples using the projection factor for each of the second samples; receiving, using the one or more computing device processors, from third one or more data sources, a third data set; computing, using the one or more computing device processors, a parameter using the third data set; selecting, using the one or more computing device processors, one or more of the projected samples to form a fourth data set; and performing, using the one or more computing device processors, a computer operation for estimating the data using the fourth data set and the parameter.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

System Environment

Figure 1:
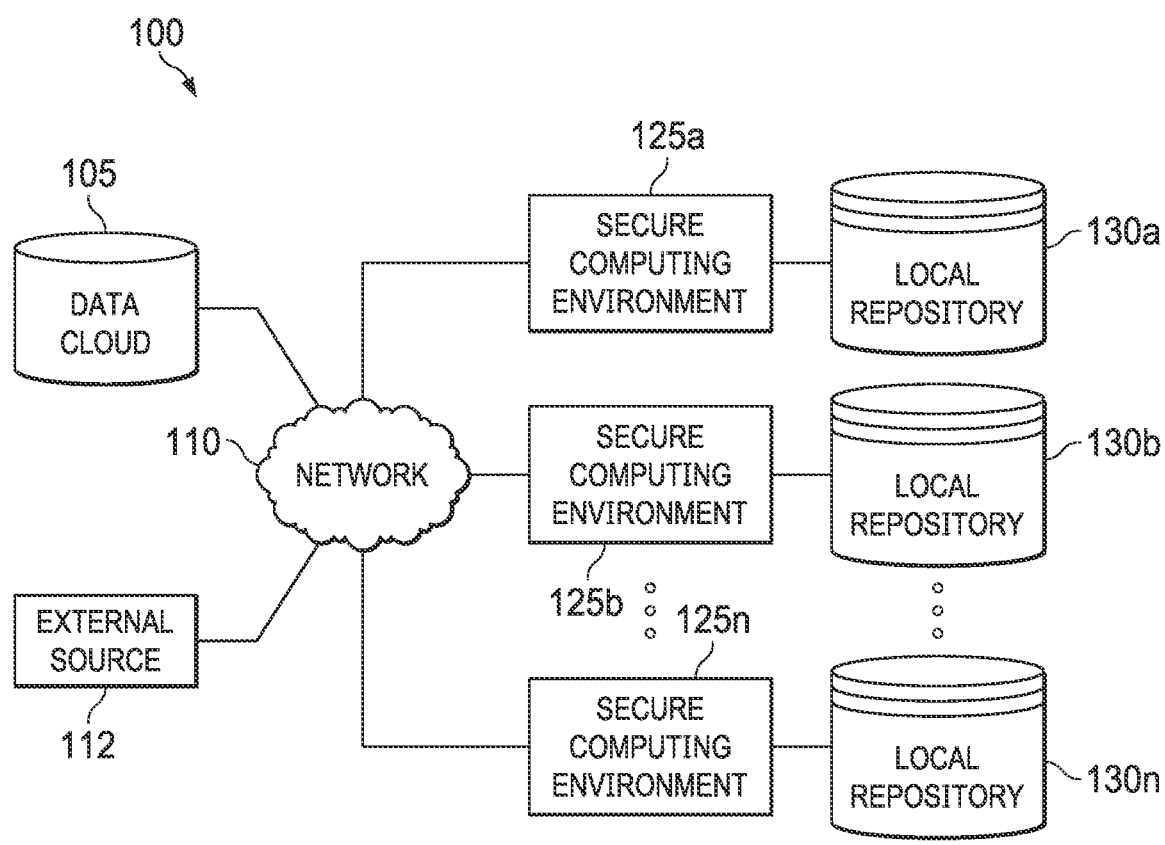
FIG. 1 is a high-level network system for accessing, managing, and sharing structured data, according to one embodiment.

Illustrated in FIG. 1 is a high level network system 100 for generating interfaces that access, maintain, analyze, and display structured data. In the depicted implementation, the system 100 may include a data cloud server 105 communicatively coupled to a plurality of secure computing environments 125 data sources 112 via the network 110. The secure computing environments 125 may in turn be communicatively coupled to a local repository 130. While a single data cloud server 105 is illustrated, the disclosed principles and techniques could be expanded to include multiple data cloud servers 105.

The data cloud server 105, according to some embodiments, is configured to store a plurality of structured data in a secure environment requiring authentication before access is granted to the structured data. According to one implementation, the structured data includes hierarchical data having varying and connected categories/levels that describe a plurality of aspects of the structured data. In some cases, the structured data in the data cloud server 105 is sourced or obtained from third-party scientific sources, and/or from third-party regulatory agencies, and/or from academic sources, and/or from industrial sources, etc.

In addition, the data cloud server 105 may be configured to manage or otherwise maintain the integrity and/or version updates of the structured data so that a user (e.g., a user of the secure computing environment) does not have to deal with such data maintenance processes as the structured data changes and/or grows. In one embodiment, the data cloud server 105 provides the most current version of the structured data to a user of the system. In other embodiments, the data cloud server 105 can also provide historical versions of the structured data when necessary or needed. Furthermore, the data cloud server 105 may include mechanisms that execute operations of data decompression operations, data decryption operations, and data decoding operations associated with the structured data so that the user is effectively isolated from such operations.

Moreover, the data cloud server 105 allows for easy associating, tagging, or coding of information for retrieval purposes. In some cases, the tagging or coding is automatically executed by the data cloud server 105. In addition, the data cloud server 105 allows a user (e.g., user of the secure computing environment 125) to transition from accessing structured data from the local repository 130 to the data cloud server 105.

The data cloud server 105 may be implemented within a computing device such as a mainframe server, a content server, a communication server, a laptop computer, a desktop computer, a handheld computing device, a virtual machine, a cloud-based computing solution and/or service, and/or the like. The data cloud server 105 may include a plurality of computing devices configured to communicate with one another and/or implement the techniques described herein. In some instances, the data cloud server 105 may include various elements of a computing environment as described with reference to FIGS. 2A and/or 2B. For example, the data cloud server 105 may include a processing system 202, a memory 204, an input/output (I/O) system 206, and a communication system 208. A user (e.g., database administrator) may operate/maintain the data cloud server 105 either locally or remotely as the case may require.

The data cloud server 105 may be configured to have storage logic that is executable to store structured data that is shared across multiple secure computing environments 125. According to one implementation, the data cloud server 105 may include a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the data cloud server 105 may include storage logic that is executable to store structured data derived from, for example, medical data, research data, education data, government data, etc. According to some implementations, the storage logic of the data cloud server 105 may be configured to automatically monitor and/or update relevant structured data obtained from a third-party source. For example, the storage logic of the data cloud server 105 may periodically monitor updates associated with structured data (e.g., dictionary of medical terms for research and regulatory purposes) from third-party organizations/sources and automatically update different versions of the structured data within one or more storage media of the data cloud server 105. In one embodiment, the storage logic of the data cloud server 105 manipulates or otherwise formats the structured data such that user interfaces generated by a secure computing environment 125 can seamlessly access/retrieve and present the structured data to a user. In addition, structured data from the data cloud server 105 may be accessed on a regulated basis via credential access, for example. This regulated basis may be determined, in part, by licenses, privileges, and other levels of authorization dictated by a user's credentials.

The external source 112 may operate similarly like the data cloud server 105 including having all the technical features of the data cloud server 105 described herein. The difference between the external source 112 and the data cloud server 105 is the external source 112 operates in providing information to the data cloud server 105 when requested. While a single external source 112 is illustrated, the disclosed principles and techniques could be expanded to include multiple data sources 112.

The local repository 130 may include storage logic for storing a local copy of structured data from the data cloud server 105. The local repository 130 may also be configured to store data other than the structured data. For example, the local repository 130 may store data from third-party sources and other data generated by the secure computing environment 125. The local repository may include a plurality of non-volatile/non-transitory storage media such as solid state storage media, hard disk storage media, virtual storage media, cloud-based storage drives, storage servers, and/or the like. According to some embodiments, the local repository 130 may include logic that updates structured data stored within its storage devices based on updates to structured data stored within the data cloud server 105. In some cases, snapshots of structured data may be accessed using the secure computing environment 125 so that updates associated with the snapshots may be effected on the local repository 130.

As previously discussed, the network 110 facilitates communication between the data cloud server 105, the external source 112, and the secure computing environment 125. The network 110 may also allow different secure computing environments 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The secure computing environment 125 is configured to generate one or more user interfaces for accessing, analyzing, and displaying the structured data. According to some implementations, the secure computing environment 125 includes functionalities and/or enhanced security features that allow a user to securely access and/or securely manage structured data. As shown more clearly in the exemplary functional and system diagrams of FIGS. 2A and 2B, the secure computing environment 125 includes a processing system 202, a memory 204, and I/O system 206, and a communication system 208. The processing system 202, the memory 204, the I/O system 206, and the communication system 208 may include one or more subsystems that perform one or more of the operations described herein. Additionally, each system of the secure computing environment 125 may be operatively and/or otherwise communicatively coupled with each other so as to facilitate one or more operations described herein. The secure computing environment 125 may include general hardware, specifically-purposed hardware, and/or a combination thereof.

Figure 2A:
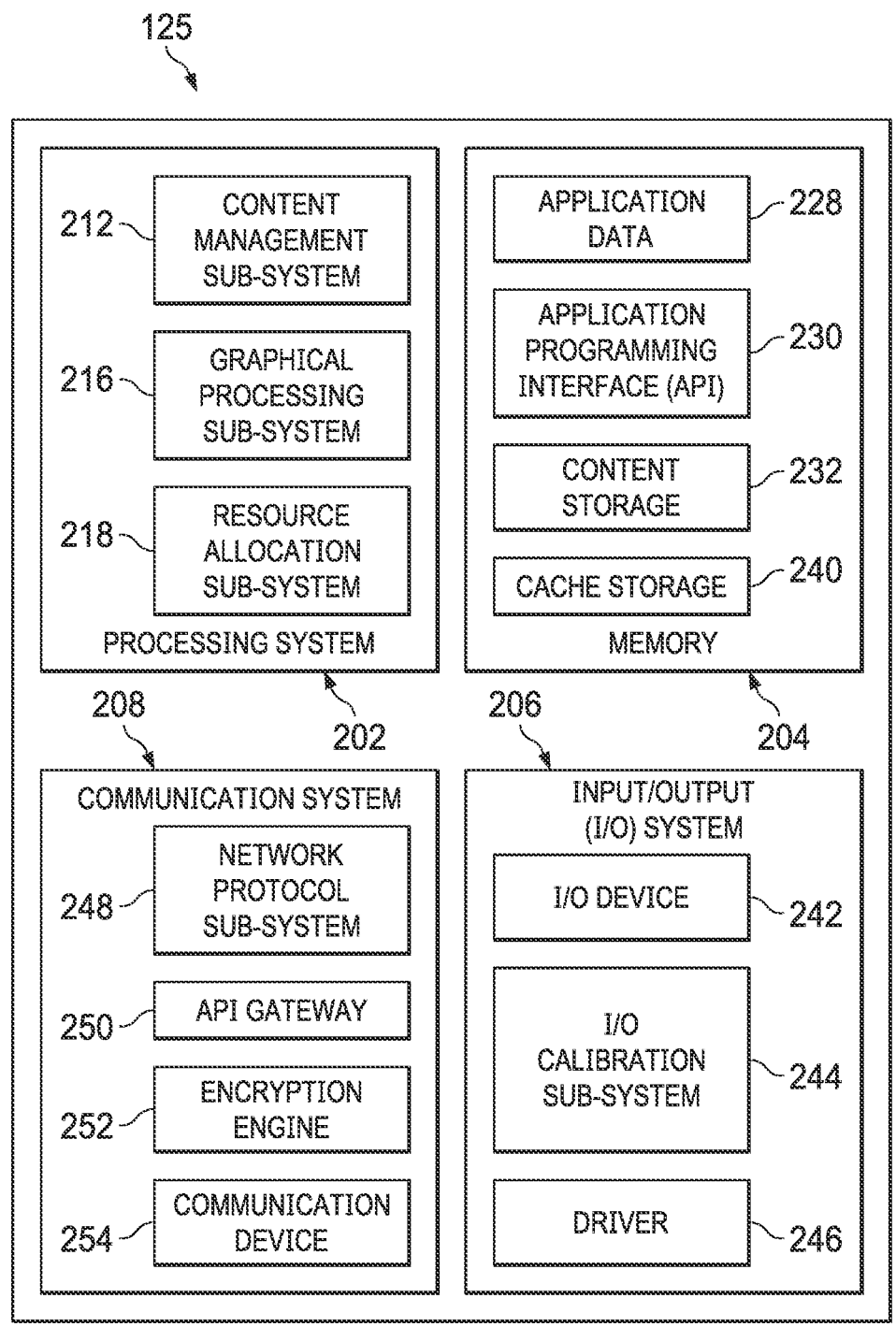
FIG. 2A is a functional block diagram of a computing environment for accessing and visualizing structured data, according to one embodiment.
Figure 2B:
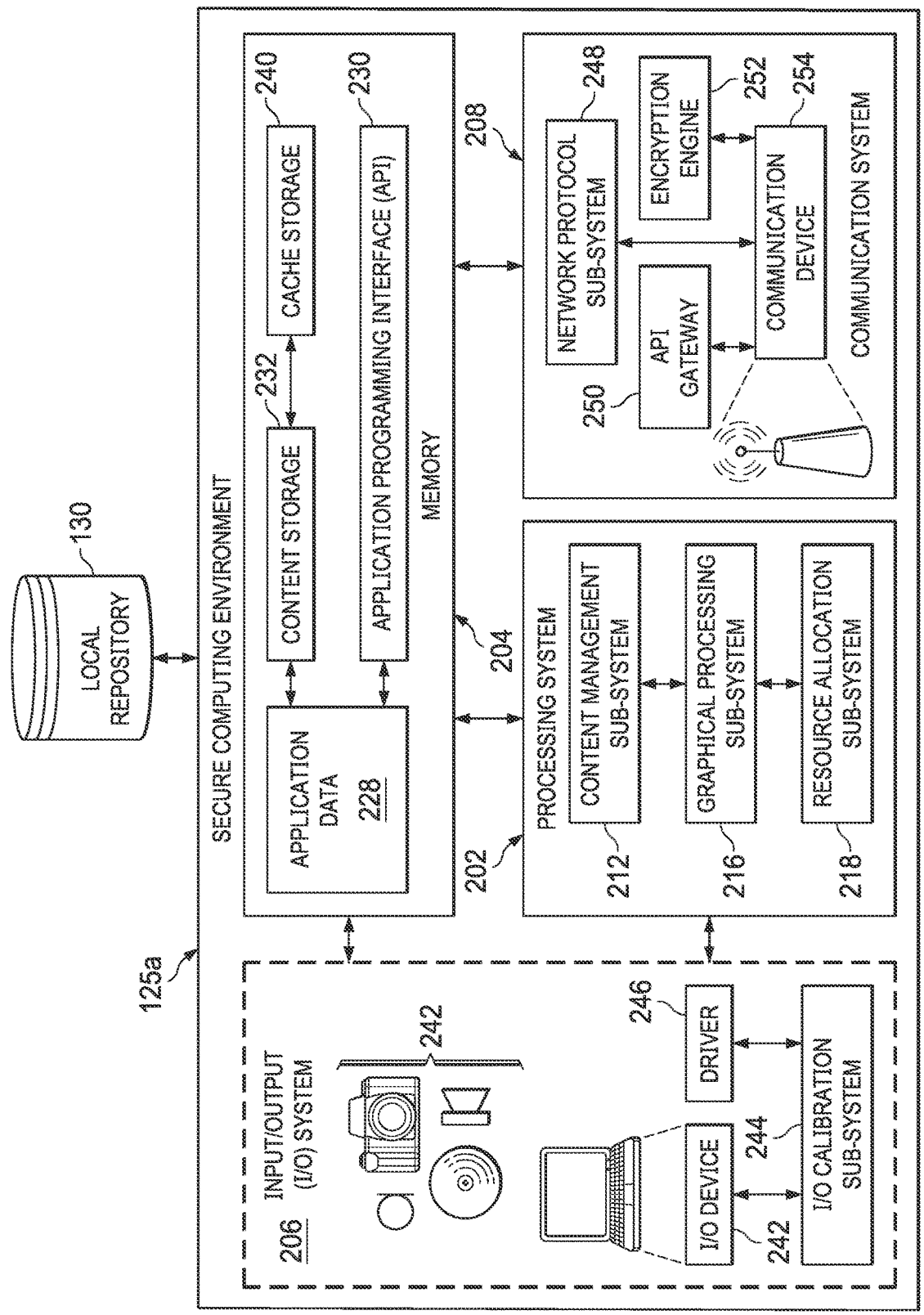
FIG. 2B is a detailed system diagram of FIG. 2A, according to one embodiment.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the secure computing environment 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the secure computing environment 125 and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, structured data content, user interfaces, or any combination thereof. In some instances, content on which the content management system 212 operates includes structured data from the data cloud server 105, structured data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the secure computing environment 125 and/or other computing environments. Computing resources of the secure computing environment 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the secure computing environment 125, as well as hardware for responding to the computing-resource needs of each system and/or subsystem. In some embodiments, the resource allocation subsystem 218 may use computing resources of a second secure computing environment separate and distinct from the secure computing environment 125 to facilitate a desired operation.

The memory 204 may be used for storing, recalling, receiving, transmitting, and/or accessing various files and/or data (e.g., structured data) during the operation of the secure computing environment 125. For example, the memory 204 may store, recall, and/or update structured data from the data cloud and/or the local repository as the case may be. In some embodiments, the memory 204 may store instructions and/or data that may be executed by the processing system 202. For instance, the memory 204 may store instructions that execute operations associated with one or more systems and/or one or more subsystems of the secure computing environment 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of secure computing environment 125, an intended operating state of secure computing environment 125, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the secure computing environment 125. Secondary storage may comprise one or more disk drives and/or tape drives which may be used for non-volatile/non-transitory storage of data or as an over-flow data storage device of the secure computing environment 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the secure computing environment 125 and/or any other computing environments described herein. As such, application data 228 may store any information and/or data associated with an application. Application data 228 may further store various pieces of information and/or data associated with the operation of an application and/or with the secure computing environment 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of secure computing environment 125 and/or any other computing environment described herein. For example, secure computing environment 125 may include one or more APIs for various devices, applications, systems, subsystems, elements, and/or other computing environments to allow communication between one or more applications associated with the secure computing environment 125. Accordingly, API 230 may include API databases containing information that may be accessed and/or used by applications, systems, subsystems, elements, and/or operating systems of other devices and/or computing environments in communication with the secure computing environment 125. In some cases, the API 230 may enable the data cloud server 105 and the secure computing environment 125 to communicate with each other.

The content storage 232 may facilitate deployment, storage, access, and/or utilization of information associated with structured data as further discussed below. In one embodiment, content storage 232 may communicate with a content management system 212 to receive and/or transmit content (e.g., structured data, media content, etc.).

The I/O system 206 may include hardware and/or software elements for the secure computing environment 125 to receive, and/or transmit, and/or present information useful for generating one or more interfaces for retrieving and displaying structured data according to some embodiments of this disclosure. For example, elements of the I/O system 206 may be used to receive input from a user of the secure computing environment 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with secure computing environment 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing structured data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of secure computing environment 125 (or an element of another computing environment) may recognize and/or integrate with I/O device 242.

The communication system 208 may facilitate establishment, maintenance, monitoring, and/or termination of communications between the secure computing environment 125 and other computing environments, third-party server systems, and/or the like. Communication system 208 may also facilitate internal communications between various elements (e.g., systems and/or subsystems) of secure computing environment 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the secure computing environment 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the secure computing environment 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of structured data.

The application programming interface (API) gateway 250 may allow other devices and/or computing environments and/or applications external to the secure computing environment 125 to access the API 230 of the memory 204. For example, a computing system may access the API 230 of the secure computing environment 125 via the API gateway 250. In some embodiments, API gateway 250 may be required to validate user credentials associated with a user of a computing device (e.g., a device external to the secure computing environment 125) prior to providing access to the API 230 to the user. API gateway 250 may include instructions for the secure computing environment 125 and thereby communicate with external devices and/or between components of the secure computing environment 125.

The encryption engine 252 may facilitate translation, encryption, encoding, decryption, and/or decoding of information received, transmitted, and/or stored by the secure computing environment 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for secure computing environment 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Projection Methodology

FIGS. 3-6 and 7A-7B describe the projection methodology used for calculating total projected transactions by applying a projection factor to observed transactions. The projection methodology provides a way to estimate total transactions using the observed transactions without requiring extensive approximation techniques or computation heavy algorithms.

Figure 3:
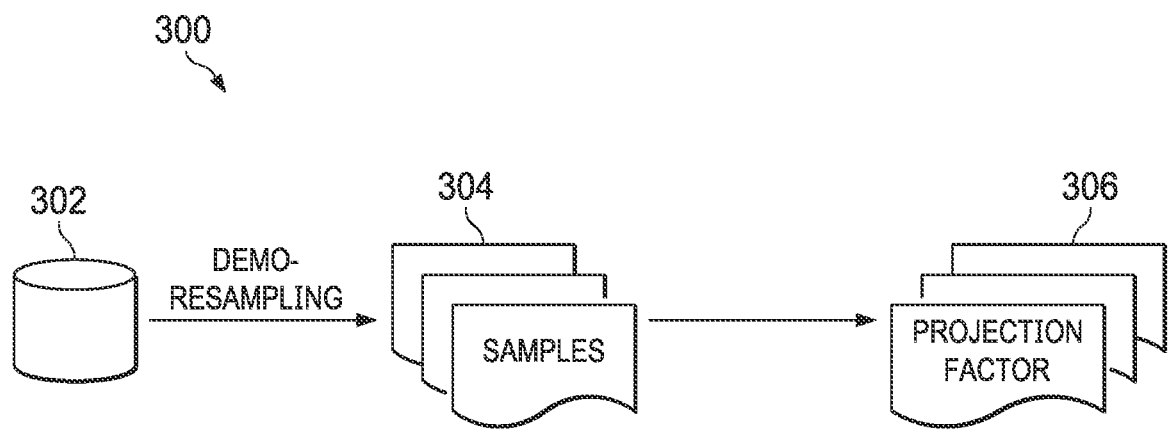
FIG. 3 shows computing projection factors used in the projection methodology, according to one embodiment.

FIG. 3 is a schematic diagram illustrating a technique 300 for computing projection factors used in the projection methodology, according to one embodiment. Data source 302 may be stored in data cloud server 105 or external source 112. External source 112 may be configured to receive a query devised by server 105 to retrieve a sample of census or historical data. Data source 302 may include census or historical data regarding a sample. In response to receiving the query, data source 302 may execute the query and retrieve the requested sample of census or historical data. Once server 105 receives the sample data, server 105 may stratify the sample census or historical data into samples 304. Samples 304 may be stratified on multiple dimensions associated with representativeness (e.g. age, sex, geography, distribution channel type, payment type, product, brand of interest, or the like) using a re-sampling technique. The re-sampling technique may be performed before data is queried for the estimation process.

A number of the samples 304 may be selected for the estimation process using a model. The model may assesses whether each of the samples 304 may be stable over the covered time period. Each sample's relationship to the census data of data store 302 may be estimated in the historical periods covered by the census data. This relationship may be then used to estimate the census or historical data in recent time periods, where the census data is not yet available, with the assumption that the relationship from the historical period holds and can be applied to the recent time period observations.

In this case, a projection factor 306 may be computed for each sample 304. The projection factor 306 for each sample 304 may be defined as the number of times an observed property occurs in the sample divided by the total times the observed occurs in the census data.

In some embodiments, the projection factors 306 may be outputted in a table or files with product as the primary key and a column for calculated coverage.

Figure 4:
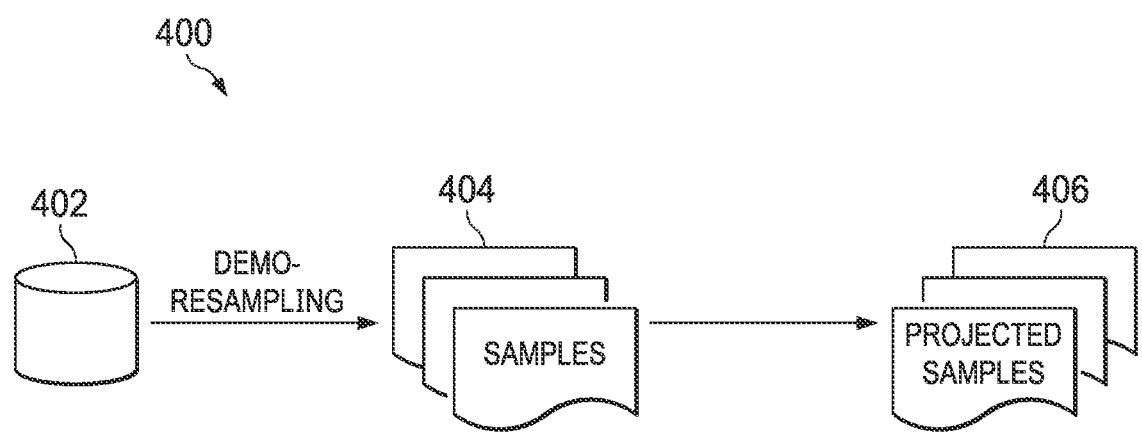
FIG. 4 shows applying the projection factors to the sample to calculate a projection, according to one embodiment.

FIG. 4 is a schematic diagram illustrating a technique 400 for computing projection for samples of data, according to one embodiment. Data source 402 may be stored in data cloud server 105 or external source 112. External source 112 may be may be configured to receive a query created by data cloud server 105 to retrieve a sample of times series data. In response to receiving the query, data source 402 may execute the query and retrieve the sample of time series data. Once server 105 receives the sample of time series data, server 105 may stratify the sample of time series data into samples 404. Samples 404 may be stratified on multiple dimensions associated with representativeness (e.g. age, sex, geography, distribution channel type, payment type, or the like) using the same re-sampling technique discussed above in FIG. 3.

Using the projection factors 306 discussed in FIG. 3, projection may be computed for each of the samples 404 forming projected samples 406. In particular, each of the projected samples 406 may be equal to the number of times an observed criteria occurs in a sample 404 divided by the projection factor.

Figure 5:
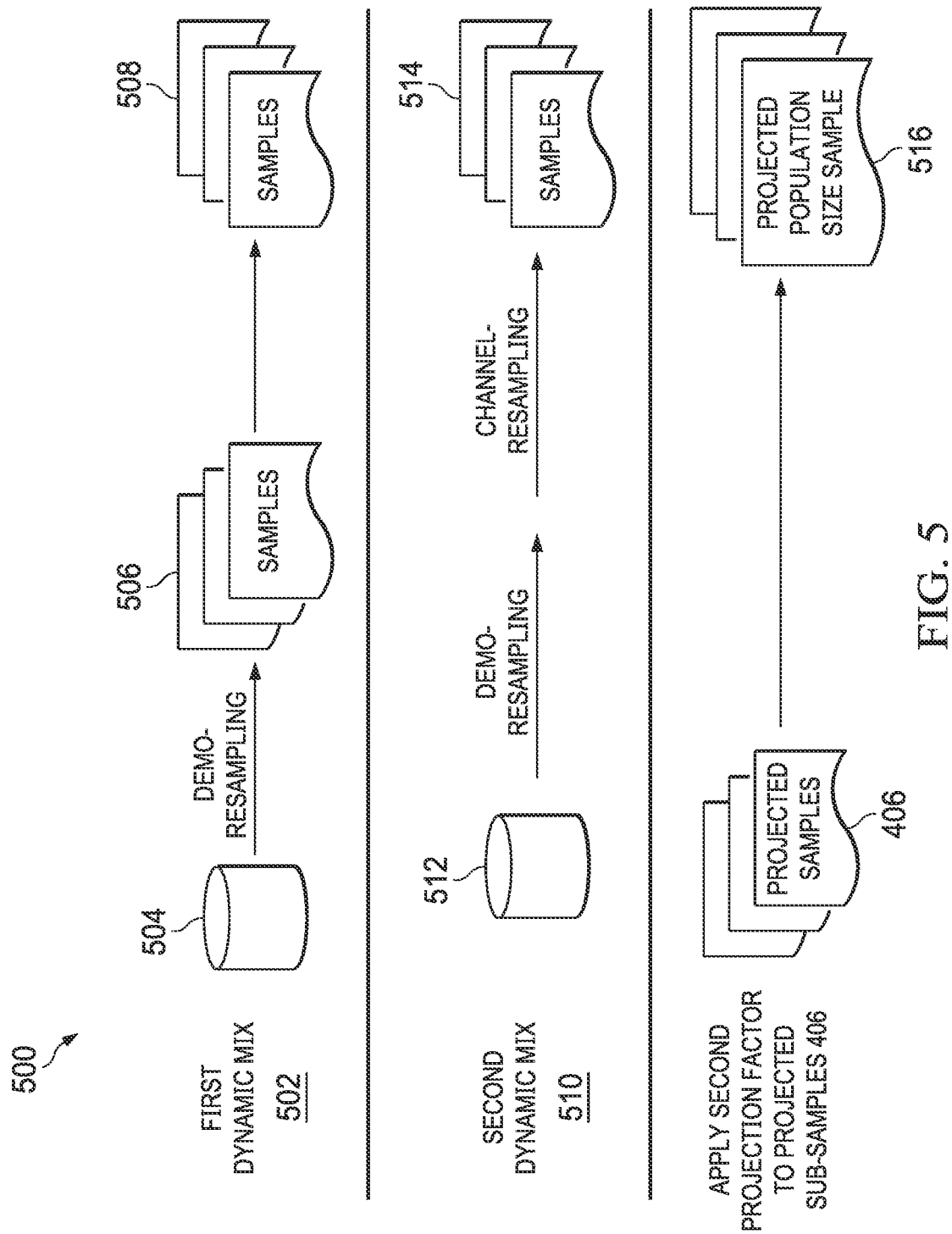
FIG. 5 shows projecting the projected samples of FIG. 4 to a total universe using features from different samples, according to one embodiment.

FIG. 5 is a schematic diagram 500 illustrating a technique 500 for estimating the projected population size, according to one embodiment. In estimating the projected population size of a sample 406, the share of the observed property in the total universe may be required. Since information about the total universe is very limited, one may need to use different data sources to extrapolate the total share of the observed property in the total universe. Once the share of the observed property in the total universe is determined, one may estimate the projected population size for each of the samples 406 by computing a second projection factor defined as:

$$\text{Second Projection Factor} = 1/\text{SOP} \qquad \text{Eq. 1}$$

where SOP is the share of the observed property.

Once the second projection is determined, one may compute for each projected sample 406 a corresponding projected population size sample 516 as follows:

$$\text{PPS} = \text{PFS}/\text{SPF} \qquad \text{Eq. 2}$$

where PPS is the projected population for a sample, PFS is the corresponding projection factor for a projected sample 406, and SPF is the second projection factor of Eq. 1.

Once the projected population size samples 516 have been computed, one may add/aggregate each of the projected population size samples 516 to compute a projected population of the total universe.

FIG. 5 shows an example of using multiple dynamic mixes 502 and 512 to determine the second projection factor. In the dynamic channel mix 502, a data source 504 may be configured to receive a query formed by data cloud server 105 to retrieve a sample of data associated with a first subset of computing transactions. In response to receiving the query, data source 504 may execute the query and retrieve the requested the sample of data associated with the first subset of transactions. Once server 105 receives the sample data associated with the first subset of transactions, server 105 may stratify the sample data associated with the first subset of transactions into samples 506. Samples 506 may be stratified based on distribution channel type using the same re-sampling technique discussed above in FIG. 3. Using samples 506, one may compute one or more first dynamic parameters of the dynamic channel mix 502.

In some implementations, samples 506 may be further stratified according to timeframe, such as weekly or daily, to form samples 508.

In the dynamic channel mix 510, a data source data source 512 may be configured to receive a query formed by data cloud server 105 to retrieve a sample data associated with a second subset of transactions. In response to receiving the query, data source 512 may execute the query and retrieve the sample data associated with the second subset of transactions. Once server 105 receives the sample data associated with the second subset of transactions, server 105 may stratify the sample data associated with the second subset of transactions into samples 514. Samples 514 may be stratified based on demographic information and distribution channel type using the same re-sampling technique discussed above in FIG. 3. Using samples 514, one or more second dynamic parameters of the dynamic channel mix 510 may be computed.

Once the one or more first dynamic parameters and the one or more second dynamic parameters are computed, the second projection factor may be calculated to determine the share of an observed criteria of the sample data. The second projection factor and the projected samples 406 may be used to compute projected population size samples 516.

Figure 6:
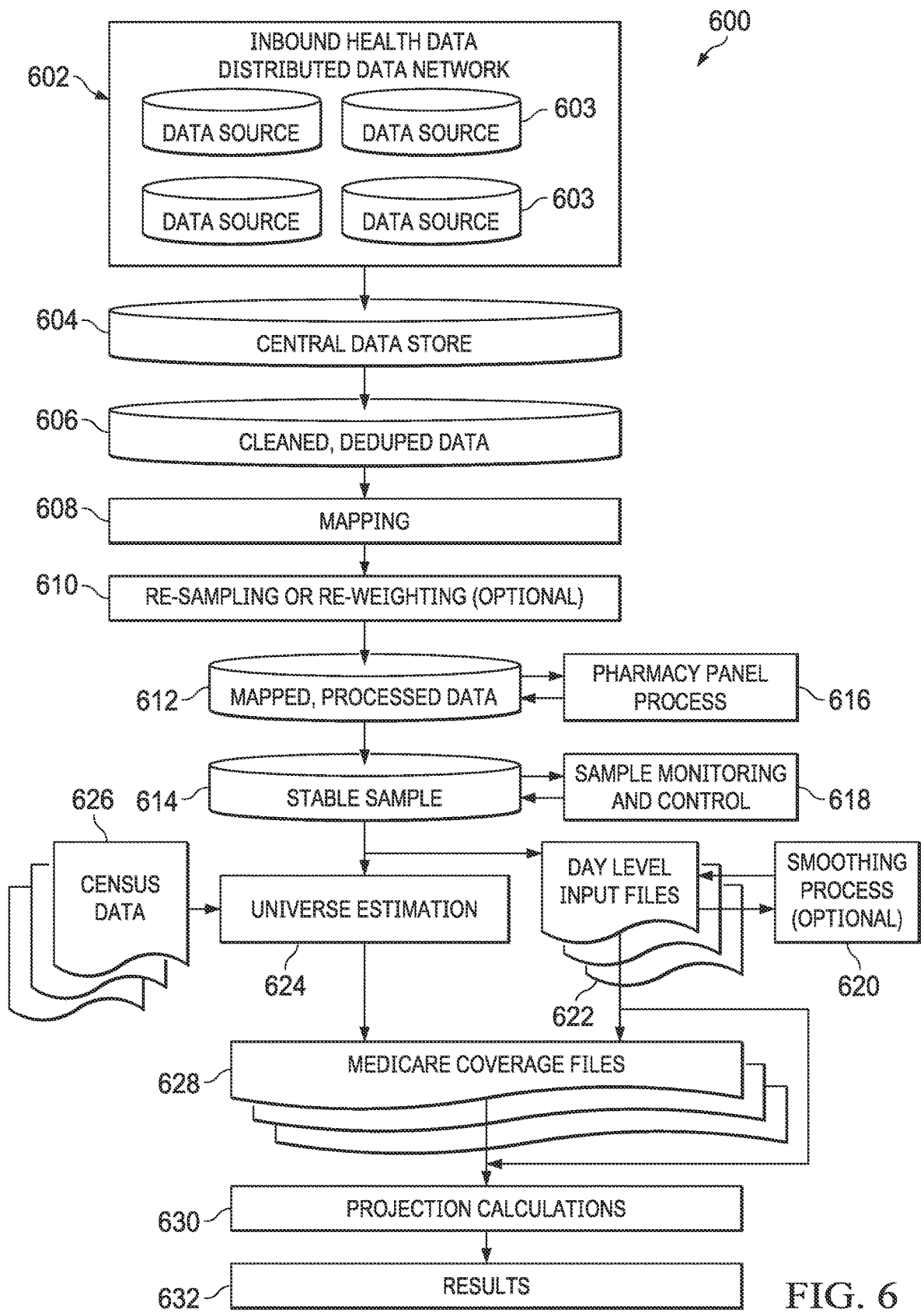
FIG. 6 shows a process flow used in the projection methodology, according to one embodiment.

FIG. 6 shows a process flow 600 used in the projection methodology, according to one embodiment. Process flow 600 includes block 602 showing a collection of data sources 603. The collection of data sources 603 may be equivalent to the data sources 112 described in FIG. 1. Each of the data sources may receive a query or command from data cloud server 105 to retrieve sample data to be sent to the data cloud server 105. In block 604, sample data may be sent to a central data store at the data cloud server 105 or to data store remote from data cloud server 105. The data store may act as a temporary storage location for processing sample data coming from the collection of data sources 603 prior to being received at data cloud server 105. At block 606, sample data may be cleaned and deduped at the data store. This may help reduce the impact of redundant data and remove information not applicable in performing the projection methodology without compromising data fidelity or integrity. Afterwards, the sample data is mapped into a format applicable for use in data server 105. In some embodiments, this mapping may be a canonical mapping or the like.

At block 610, re-sampling or the re-weighting of the sample data is performed to form a number of samples, as described in FIGS. 3-5. Re-sampling of the sample data may involve stratifying the sample data on multiple dimensions associated with representativeness (e.g. age, sex, geography, distribution channel type, payment type). Moreover, re-sampling may require using population reference data from multiple sources to identify appropriate weights for each dimension associated with representativeness.

In some embodiments, weights for each multidimensional stratum may be estimated using iterative proportional fitting (raking) or other methods. In other embodiments, the weights may be appended to sample observations and preserved through subsequent steps, when summarizing observations from the sample, they are multiplied by the weights. In some embodiments, the sample is re-sampled to achieve the appropriate weights for each stratum; this is achieved by randomly removing observations in strata with weights that are too high.

At block 612, the samples are mapped and processed using information from a panel process at block 616. The panel process may select the most relevant inclusion parameters from the collection of data sources 603 to be mapped. Inclusion parameters may define which set of information is used in the samples. In some embodiments, the panel process at block 616 may utilize inclusion metrics defined by the inclusion parameters to determine which data should be included in the samples. In some embodiments, the inclusions metrics may include determining the variance of one or more parameters of the inclusions metrics. In some embodiments, a logic may be applied to the dimensions in the sample (e.g., to return only a given percentage of the sample where a dimension has a certain value, or to exclude a sample where a dimension exceeds a specified value).

At block 614, one or more of the samples may be selected to be included in the estimation process using a model. The model performs sample monitoring and control, as shown at block 618. The model may send the selected samples to blocks 622 and 624. At block 622, the selected samples may include daily level information regarding transaction under analysis. At block 620, a smooth process may be used to smooth the data of some of the samples.

In some embodiments, each of the samples may have a sample size above a threshold, however those samples that do not meet the threshold are smoothed according to the smoothing process at block 620.

In some embodiments, for small samples to be smoothed (sample size below a specified threshold), their data may be normalized in a rolling time window. Afterwards, the normalized data is compared by volume to the normalized data of standard samples. The trends in the normalized data of standard samples may be used to smooth the normalized data of the smaller samples. The adjusted normalized data of the smaller samples may be reassigned At block 624, a universe estimation module may be used to calculate a projection factor for each of the samples using census or historical data at block 626. The approach used to calculate projection factors at block 624 may be similar to those discussed in FIG. 3. Once the projection factors for the samples have been calculated, the corresponding coverage files are produced at block 628.

At block 630, projection calculations may be performed using the coverage files and the samples received from block 622. The projection calculations described herein may be similar to the projection calculations described in FIG. 4. Once the projection calculations are complete, projection samples may be produced at block 632. Note the projection samples at block 632 may be similar to the projection samples 406.

Workflow

Figure 7A:
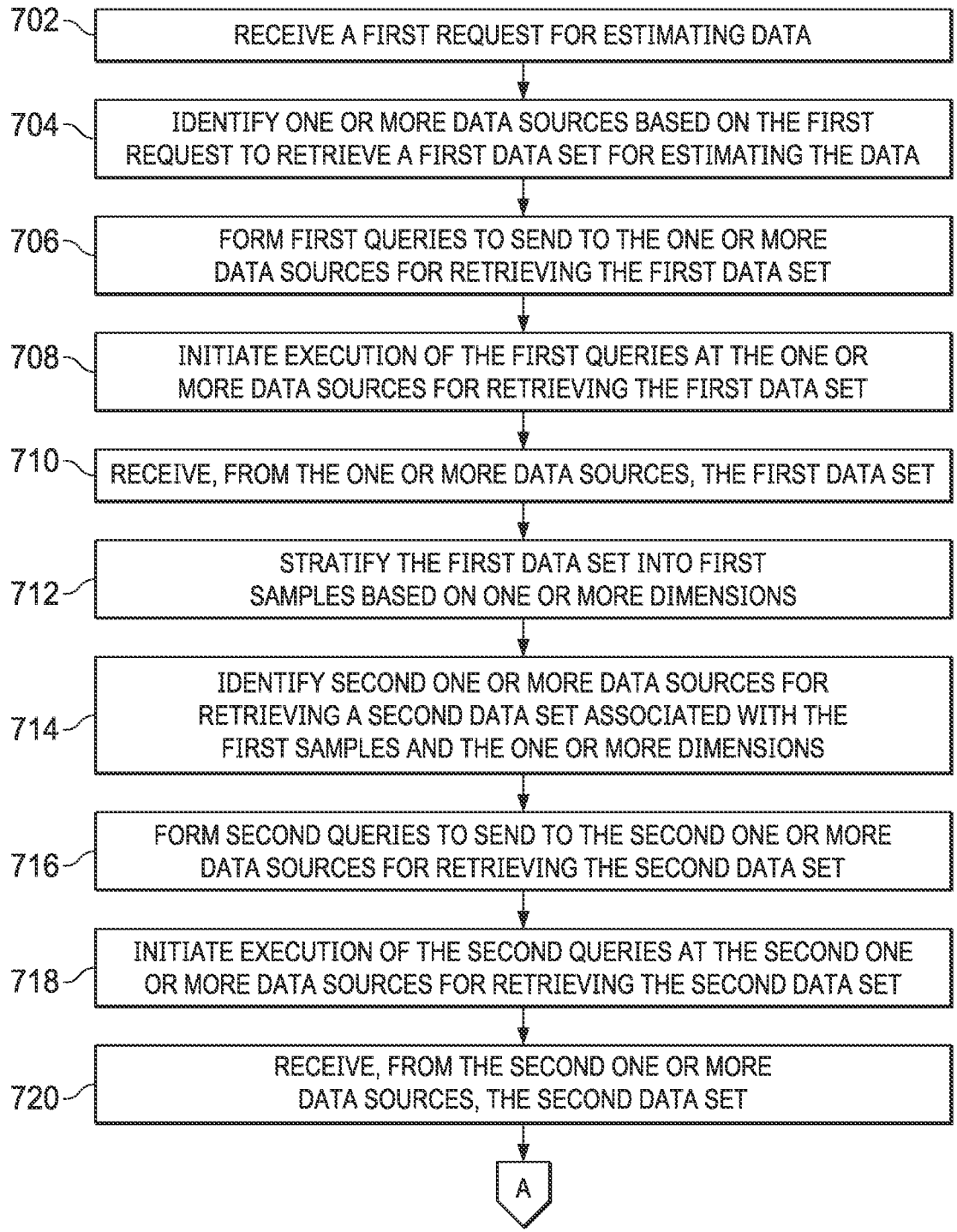
FIGS. 7A and 7B show a flowchart illustrating a method for managing and producing estimation data using one or more data cloud servers, according to one embodiment.
Figure 7B:
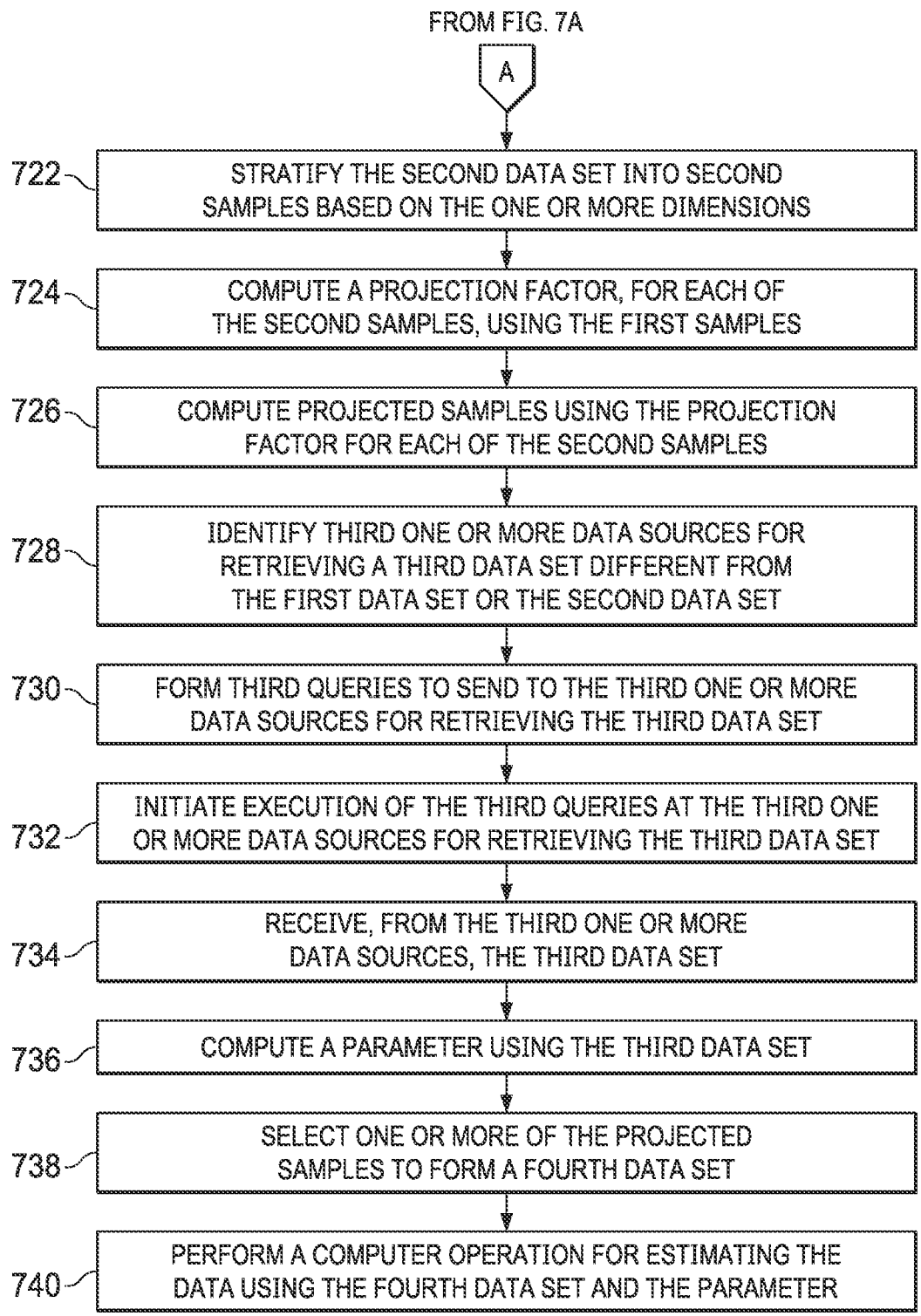

FIGS. 7A and 7B show a flowchart 700 illustrating a method for managing and producing estimation data using one or more data cloud servers 105, according to one embodiment. At block 702, the method includes receiving, using one or more computing device processors, a first request for estimating data. At block 704, the method includes identifying, using the one or more computing device processors, one or more data sources from the first request to retrieve a first data set for estimating the data. At block 706, the method includes forming, using the one or more computing device processors, a plurality of first queries to be sent to the one or more data sources for retrieving the first data set. At block 708, the method includes initiating, using the one or more computing device processors, execution of the first queries at the one or more data sources for retrieving the first data set. At block 710, the method includes receiving, using the one or more computing device processors, from the one or more data sources the first data set.

At block 712, the method includes stratifying, using the one or more computing device processors, the first data set into a plurality of samples based on one or more dimensions. The method includes identifying, using the one or more computing device processors, second or more data sources for retrieving a second data set associated with the samples and the one or more dimensions, as shown at block 714. Also, the method includes forming, using the one or more computing device processors, a plurality of second queries to be sent to the second one or more data sources for retrieving the second data set, as shown at block 716. At block 718, the method includes initiating, using the one or more computing device processors, execution of the second queries at the second one or more data sources for retrieving the second data set.

At block 720, the method includes receiving, using the one or more computing device processors, from the second one or more data sources the second data set. Moreover, the method includes stratifying, using the one or more computing device processors, the second data set into a plurality of second samples based the on one or more dimensions, as shown at block 722. Also, the method includes computing, using the one or more computing device processors, a first projection factor for each of the samples using the second data set and the first data set, as shown at block 724. At block 726, the method includes computing a plurality of projected samples using the first projection factor for each of the samples of the second data set.

At block 728, the method includes identifying, using the one or more computing device processors, third one or more data sources for retrieving a third data set associated with data different from the first data set or the second data set. The method includes forming, using the one or more computing device processors, a plurality of third queries to be sent to the third one or more data sources for retrieving the third data set, as shown at block 730. Moreover, the method includes initiating, using the one or more computing device processors, execution of the third queries at the second one or more data sources for retrieving the third data set, as shown at block 732. At block 734, the method includes receiving, using the one or more computing device processors, from the third one or more data sources the third data set.

At block 736, the method includes computing, using the one or more computing device processors, a parameter using the third data set. At block 738, the method includes selecting, using the one or more computing device processors, one or more of the projected samples to form a fourth data set. The method includes computing, using the one or more computing device processors, the estimated data of the fourth data set using the parameter, as shown at block 740.

In some embodiments, data cloud server may form queries by determining at least one network location of the one or more external devices 112. In some embodiments, the data cloud server 105 may send the first data set to a data store, discussed at block 604 of FIG. 6, for processing. In some embodiments, the data cloud server 105 may performing cleaning and de-duplicating operations on data of the first data set at the data store. In some embodiments, the data cloud server 105 may map, as discussed at block 608 of FIG. 6, data of the first data set according to a canonical format operable on one or more data cloud servers.

In some embodiments, the data cloud server 105 may determine locations of data sources having time series data associated with the samples. In some embodiments, the data cloud server 105 may monitor stability of the samples using a model. In some embodiments, the data cloud server 105 may assess which of the samples are stable over a time period using the model. In some embodiments, the data cloud server 105 may select one or more of the samples to be used for computing the estimated data using the model.

In some embodiments, the data cloud server 105 may map the samples to one or more inclusion parameters, the one or more inclusion parameters determining data to be included in the samples. In some embodiments, the data cloud server 105 may utilize inclusion metrics defined by the one or more inclusion parameters to determine numerically which data should be included in the samples. In some embodiments, the data cloud server 105 may assess variances of the inclusion metrics to determine which data should be included in the samples.

In some embodiments, the data cloud server 105 may identify one or more census or historical data sources. In some embodiments, the data cloud server 105 may stratify the first data set into the plurality of samples are configured to utilize data from the one or more census or historical data sources to form the samples. In some embodiments, the data cloud server 105 may stratify the first data set into the plurality of samples are configured to identify one or more weights for each of the one or more dimensions. In some embodiments, the data cloud server 105 may identify one or more weights are configured to estimate the one or more weights for each of the one or more dimensions using iterative proportional fitting.

In some embodiments, the data cloud server 105 may identify one or more weights are configured to append to the samples the one or more weights to preserve values of the one or more weights through subsequent processing. In some embodiments, the data cloud server 105 may identify one or more weights are configured to randomly re-sample the samples to achieve the appropriate one or more weights for each of the one or more dimensions.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for performing data cloud operations using one or more data cloud servers, the method comprising:
   receiving, using one or more computing device processors, a first request for estimating data;
   identifying, using the one or more computing device processors, one or more data sources based on the first request to retrieve a first data set for estimating the data;
   forming, using the one or more computing device processors, first queries to send to the one or more data sources for retrieving the first data set;
   initiating, using the one or more computing device processors, execution of the first queries at the one or more data sources for retrieving the first data set;
   receiving, using the one or more computing device processors, from the one or more data sources, the first data set;
   stratifying, using the one or more computing device processors, the first data set into first samples based on one or more dimensions;
   identifying, using the one or more computing device processors, second one or more data sources for retrieving a second data set associated with the first samples and the one or more dimensions;

forming, using the one or more computing device processors, second queries to send to the second one or more data sources for retrieving the second data set;

initiating, using the one or more computing device processors, execution of the second queries at the second one or more data sources for retrieving the second data set;

receiving, using the one or more computing device processors, from the second one or more data sources, the second data set;

stratifying, using the one or more computing device processors, the second data set into second samples based on the one or more dimensions;

computing, using the one or more computing device processors, a projection factor, for each of the second samples, using the first samples, wherein the computing comprises dividing a number of times that a property occurs in one of the second samples by a number of times that the property occurs in second data, thereby resulting in the projection factor;

computing, using the one or more computing device processors, projected samples using the projection factor for each of the second samples, wherein the computing comprises dividing a number of times a criteria occurs in the one of the second samples by the projection factor, thereby resulting in the projected samples;

identifying, using the one or more computing device processors, third one or more data sources for retrieving a third data set different from the first data set or the second data set;

forming, using the one or more computing device processors, third queries to send to the third one or more data sources for retrieving the third data set;

initiating, using the one or more computing device processors, execution of the third queries at the third one or more data sources for retrieving the third data set;

receiving, using the one or more computing device processors, from the third one or more data sources, the third data set;

computing, using the one or more computing device processors, a parameter using the third data set, wherein the computing comprises dividing by a share of an observed property in the data, thereby resulting in the parameter;

selecting, using the one or more computing device processors, one or more of the projected samples to form a fourth data set; and performing, using the one or more computing device processors, a computer operation for estimating the data using the fourth data set and the parameter, wherein the performing the computer operation comprises dividing a sample projection factor for the one or more of the projected samples by the parameter.

2. The method of claim 1, wherein forming the first queries comprises determining at least one network location of the one or more data sources.

3. The method of claim 1, wherein receiving, from the one or more data sources, the first data set comprises sending the first data set to a data store for processing.

4. The method of claim 3, further comprising performing cleaning and de-duplicating operations on the first data set at the data store.

5. The method of claim 1, wherein receiving, from the one or more data sources, the first data set comprises mapping the first data set according to a canonical format operable on one or more data cloud servers.

6. The method of claim 1, wherein identifying the second one or more data sources comprises determining locations of data sources having time series data associated with the second samples.

7. The method of claim 1, further comprising monitoring stability of the first samples using a model.

8. The method of claim 7, wherein monitoring the stability of the first samples comprises assessing which of the first samples are stable over a time period using the model.

9. The method of claim 8, wherein monitoring the stability of the first samples comprises selecting one or more of the first samples to be used for performing the computer operation for estimating the data.

10. The method of claim 1, further comprising mapping the first samples to one or more inclusion parameters, the one or more inclusion parameters used in determining inclusion data to be included in the first samples.

11. The method of claim 10, wherein mapping the first samples to the one or more inclusion parameters comprises utilizing inclusion metrics defined by the one or more inclusion parameters to determine inclusion data for inclusion in the first samples.

12. The method of claim 11, wherein utilizing the inclusion metrics comprises assessing variance of the inclusion metrics to determine the inclusion data for inclusion in the first samples.

13. A system for performing data cloud operations using one or more data cloud servers, the system comprising:
   one or more computing device processors; and
   one or more computing device memories, coupled to the one or more computing device processors, the one or more computing device memories storing instructions executed by the one or more computing device processors, wherein the instructions are configured to:
      receive a first request for estimating data;
      identify one or more data sources based on the first request to retrieve a first data set for estimating the data;
      form first queries to send to the one or more data sources for retrieving the first data set;
      initiate execution of the first queries at the one or more data sources for retrieving the first data set;
      receive, from the one or more data sources, the first data set;
      stratify the first data set into first samples based on one or more dimensions;
      identify second one or more data sources for retrieving a second data set associated with the first samples and the one or more dimensions;
      form second queries to send to the second one or more data sources for retrieving the second data set;
      initiate execution of the second queries at the second one or more data sources for retrieving the second data set;
      receive, from the second one or more data sources, the second data set;
      stratify the second data set into second samples based on the one or more dimensions;
      compute a projection factor, for each of the second samples, using the first samples, wherein the compute comprises divide a number of times that a property occurs in one of the second samples by a number of times that the property occurs in second data, thereby resulting in the projection factor;

compute projected samples using the projection factor for each of the second samples, wherein the compute comprises divide a number of times a criteria occurs in the one of the second samples by the projection factor, thereby resulting in the projected samples;

identify third one or more data sources for retrieving a third data set different from the first data set or the second data set;

form third queries to send to the third one or more data sources for retrieving the third data set;

initiate execution of the third queries at the third one or more data sources for retrieving the third data set;

receive, from the third one or more data sources, the third data set;

compute a parameter using the third data set, wherein the compute comprises divide by a share of an observed property in the data, thereby resulting in the parameter;

select one or more of the projected samples to form a fourth data set; and perform a computer operation for estimating the data using the fourth data set and the parameter, wherein the perform the computer operation comprises divide a sample projection factor for the one or more of the projected samples by the parameter.

14. The system of claim 13, wherein the instructions are further configured to identify one or more census or historical data sources.

15. The system of claim 14, wherein the instructions to stratify the first data set into the first samples are configured to utilize data from the one or more census or historical data sources to form the first samples.

16. The system of claim 13, wherein the instructions to stratify the first data set into the first samples are configured to identify one or more weights for each of the one or more dimensions.

17. The system of claim 16, wherein the instructions to identify the one or more weights are configured to estimate the one or more weights for each of the one or more dimensions using iterative proportional fitting.

18. The system of claim 16, wherein the instructions to identify the one or more weights are configured to append the one or more weights to the first samples to preserve values of the one or more weights through subsequent processing.

19. The system of claim 16, wherein the instructions to identify the one or more weights are configured to randomly re-sample the first samples to achieve appropriate values of the one or more weights.

20. A method for performing data cloud operations using one or more data cloud servers, the method comprising:

receiving, using one or more computing device processors, from one or more data sources, at least a first data set;

stratifying, using the one or more computing device processors, the at least first data set into at least first samples based on one or more dimensions;

receiving, using the one or more computing device processors, from second one or more data sources, a second data set;

stratifying, using the one or more computing device processors, the second data set into second samples based on the one or more dimensions;

computing, using the one or more computing device processors, a projection factor, for each of the second samples, using the at least first samples, wherein the computing comprises dividing a number of times that a property occurs in one of the second samples by a number of times that the property occurs in second data, thereby resulting in the projection factor;

computing, using the one or more computing device processors, projected samples using the projection factor for each of the second samples, wherein the computing comprises dividing a number of times a criteria occurs in the one of the second samples by the projection factor, thereby resulting in the projected samples;

receiving, using the one or more computing device processors, from third one or more data sources, a third data set;

computing, using the one or more computing device processors, a parameter using the third data set, wherein the computing comprises dividing by a share of an observed property in the data, thereby resulting in the parameter;

selecting, using the one or more computing device processors, one or more of the projected samples to form a fourth data set; and performing, using the one or more computing device processors, a computer operation for estimating the data using the fourth data set and the parameter, wherein the performing the computer operation comprises dividing a sample projection factor for the one or more of the projected samples by the parameter.

* * * * *